Figure 1:
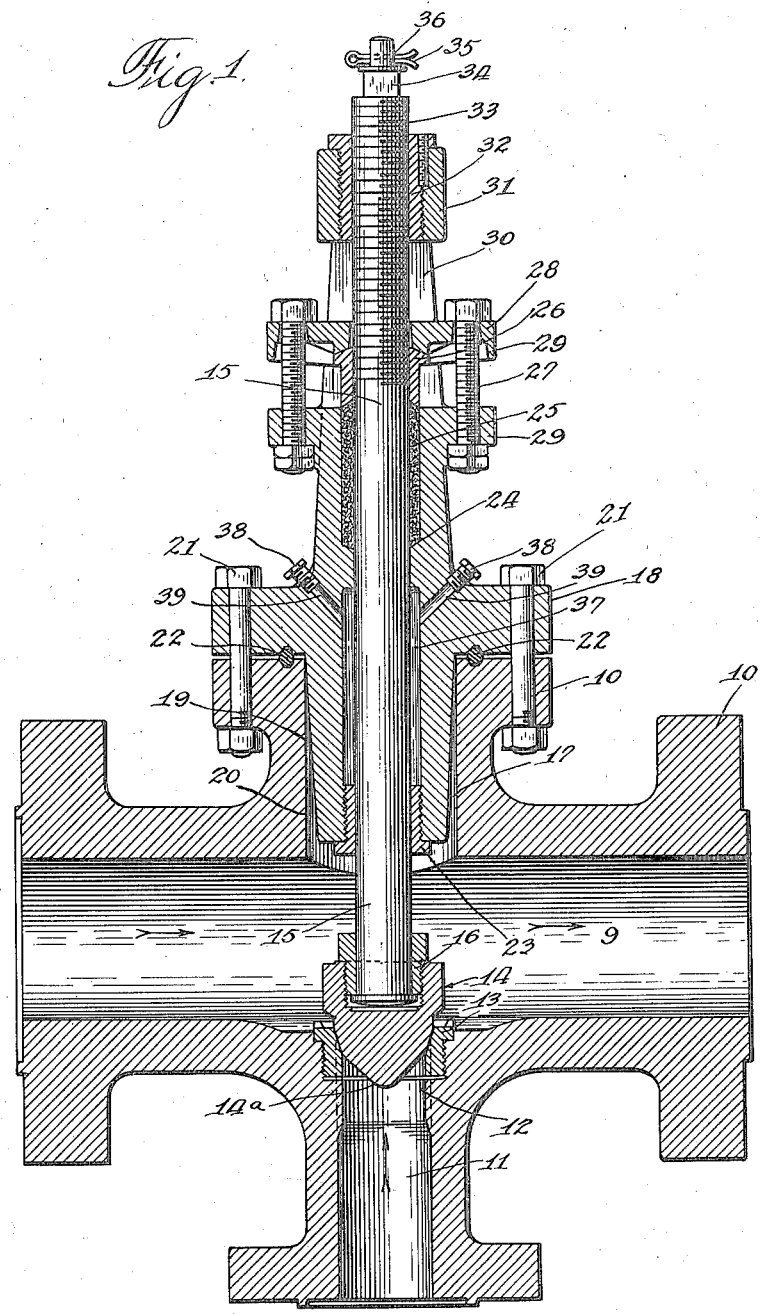

March 16, 1937.  J. K. MacKINNON  2,074,091
PRESSURE CONTROL VALVE
Filed April 11, 1935  2 Sheets-Sheet 1

Inventor:
John K. MacKinnon
By: Jones, Addington, Ames & Seibold
Attys

March 16, 1937.  J. K. MacKINNON  2,074,091
PRESSURE CONTROL VALVE
Filed April 11, 1935   2 Sheets-Sheet 2
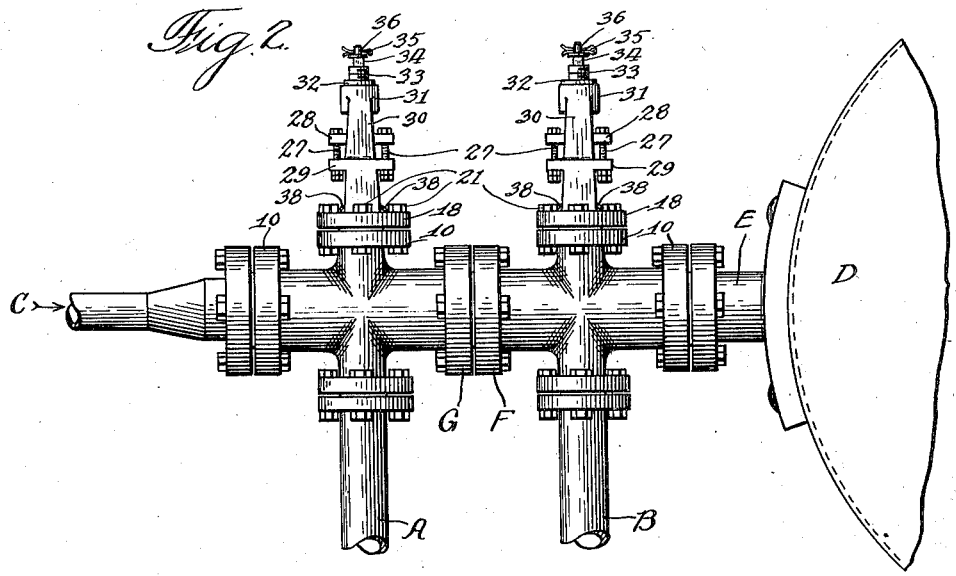
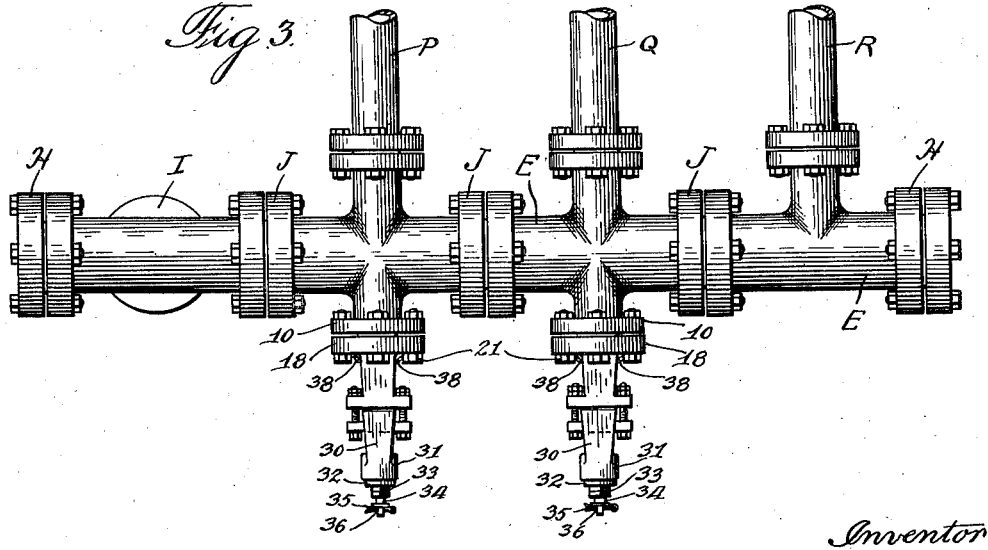
Inventor:
John K. MacKinnon
By Jones, Addington, Ames & Seibold
Attys.

Patented Mar. 16, 1937

2,074,091

UNITED STATES PATENT OFFICE 2,074,091

PRESSURE CONTROL VALVE

John K. MacKinnon, McPherson, Kans.

Application April 11, 1935, Serial No. 15,793

3 Claims. (Cl. 251—155)

The present invention relates to an improved control valve suitable for use in connection with oil cracking stills and systems.

One of the primary objects of the invention is to provide a valve construction so constituted as to permit accurate and perfect control of the pressure in a high-pressure cracking oil without danger of having the valve become plugged with carbon or other insoluble material.

A further object of the invention is to provide a valve construction in the form of a cross-valve in which the high-pressure stream of oil enters through one side of the cross while simultaneously a stream of cooler or quenching oil passes longitudinally through the cross, flowing about the valve parts so as to keep them cool and free from incrustations and deposits.

A further object of the invention is to provide a valve construction of the type indicated in which the valve stem is separately cooled by means of a liquid such as oil or water and which stem is externally threaded so that it may serve to actuate the valve plug without danger of the threads becoming clogged with coke or other deposits.

Still a further object of the invention is to provide a valve so constructed that two or more of them may be used in parallel so as to serve for the expansion of separate streams of cracked or heated oil, all of which are intended to be fed into a single line, while at the same time providing means for the ready inspection and repair of the valve when the still is shut down, without the necessity of disassembling the entire valve construction.

Other objects of the invention will become apparent from the hereunto attached drawings and the further detailed description to follow below.

In Figure 1 of the drawings the valve is shown in longitudinal cross-section, this view being sufficient to illustrate the parts upon which the present invention is based and the essential construction and details of the valve.

In Fig. 2 are shown two of the valves, made in accordance with the present invention, used in parallel to control two separate streams of oil, while at the same time either hot or cold quenching or flushing oil is fed through the discharge line from the left.

In Fig. 3 two valves are shown in parallel, leading into a common header with a separate line for hot or cold oil for either quenching or flushing, also showing blind flanges permitting easy access to the internal parts of the valves.

Referring for the moment to Fig. 1, which shows the detailed construction of the valve, it will be seen that this consists of a cross-shaped member 10 which is preferably made of nickel-chrome alloy cast steel, or equally strong, durable material, because it must withstand considerable pressure and high temperatures; in fact, the pressures commonly met with in the types of operation to which this valve is applicable are on the order of 400 lbs. to as high as 1,000 lbs. per square inch. This housing has on one side (the lower side of the figure) a passageway or transfer line 11, which is in effect a continuation of the high-pressure coil in which the oil is being treated. This passageway is slightly lessened in diameter at 12, finally terminating in a suitable valve seat 13. This valve seat is carefully ground so as to make tight contact with valve plug 14, which in turn is secured to valve stem 15 by means of a screw gland 16, the attachment being such that the plug 14 is freely rotatable upon the stem 15, and when the stem is rotated the plug need not necessarily partake of the rotational movement.

Immediately opposite the opening 11 and in central alignment with the valve stem 15 there is an opening 17 closed by means of a bonnet 18. This bonnet has slightly tapered sides, as shown at 19, the walls of which are highly polished. The interior walls 20 of that portion of the passageway 17 which are in close proximity to the surface 19 are also preferably made with a smooth finish or may be polished. The purpose of this is to prevent as far as possible the adhesion of carbon or other material to these surfaces. The bonnet 18 is secured to the body part 10 of the valve by means of bolts 21.

Between the valve-body part 10 and the bonnet 18 there is located an annular mild steel gasket 22 which fits into suitable grooves cut into the parts 10 and 18, thereby serving to render the connection between the two parts liquid- and gas-tight. In the lowermost part of the projecting portion of the bonnet 18 there is secured a valve-stem chamber bushing 23 through which the stem 15 of the valve passes snugly.

At the upper part of the valve bonnet 18 there is provided a space 24 surrounding the stem, and which normally is filled with a packing material 25 which is compressed by means of a gland 26. This gland in turn is forced into the annular opening 24 and against the packing 25 by means of a compression member 28 which itself is connected to the valve bonnet by means of bolts 27 which pass through flanges 29. Connected with the bonnet of the valve there is a yoke 30, at the top of which there is an annular portion 31 containing a threaded hollow plug 32 which engages threads 33 at the upper part of the valve stem 15. At the extreme upper end of the valve stem 15 there is a square portion 34 which engages the hand wheel of the valve (not shown). To prevent the removal of the hand wheel there is provided a usual cotter pin 35 which passes through a drilled opening 36 in the smaller portion of the upper end of the valve stem 15. The threads are so cut that when the valve wheel is rotated in a counterclockwise direction the plug will be released from the valve seat at the side of the valve body and will permit flow of oil from the passage or transfer line 11 in the direction of the arrow and into the central portion 9 of the valve body.

In the bonnet 18 there is also provided a hollow space 37 which by virtue of the passage therethrough of the valve stem 15 becomes an annular space and which serves for the circulation of a cooling medium such as oil, which is fed into this annular space 37 through openings 38 which communicate with passages 39. The oil may enter either one of these passages and discharge through the other, the direction of flow being a matter of indifference, but sufficient flow should be maintained to cool the valve stem, so as to prevent the burning and destruction of the packing 25 and undue expansion, and hence binding of the threads 33. This cooling by means of oil is an important feature and forms an essential part of the present invention.

When the valve is in use, either heated or cooled so-called quench-oil is passed into the central valve chamber 9 from either direction. As shown by the arrow in the drawings and for the purpose of illustrating the invention, the quenching or cooling oil is presumed to be coming from the left and flowing toward the right. It will hence flow around the valve stem 15 and, whenever the valve plug is not seated upon its seat 13, will obviously also flow about the face of the plug. This plug, it will be noticed, is given a slightly conical taper, so as to have a sort of blunt nose-like portion 14a for the purpose of dividing the hot oil stream flowing through the passageway 11 in the direction of the arrow. Inasmuch as the oil coming through the passageway 11 is under high temperature and pressure and in many cases is actually in the vapor state, it will discharge with considerable force and velocity into the central chamber 9 of the valve body, therein becoming mixed with the stream of cooling or quenching oil flowing therethrough. The result of this intermingling in general is to arrest greatly the speed of the cracking and in some cases to stop it entirely. The intermingled streams of oil then pass to the right and out of the valve into a pipe line or transfer line connected thereto by means of suitable flanges and gaskets, which however form no part of the present invention.

The main object to be attained by the construction shown herein is to produce a valve having a plug which can be removed from its seat by means of a valve stem that is prevented from becoming distorted, or contaminated by deposits, by being continuously cooled by the quenching oil flowing about the plug and end thereof as well as by additional cooling oil or other liquid which is circulated through the annular space 37 and through the openings 38.

Referring now to Fig. 2, which is a diagrammatic representation showing the valves in use, it will be seen that there are two of them, marked on the said drawings respectively "A" and "B." Of these, it will be assumed that the pipe B is bringing oil from a high-pressure cracking still, the pipe A is bringing oil from a comparatively low-temperature preheating still, while the pipe C is bringing either hot or cold quenching or flushing oil which therefore is given a direction at right angles to that of the two streams of oil under pressure. At the extreme right-hand side of the drawings (in Fig. 2) there will be seen a small section of an evaporating chamber or vaporizing chamber marked "D" into which the pipe E discharges. If at any time, as when the plant is shut down, it is desired to inspect the plugs 14 of the said valves, then all that is necessary is to separate the pipe E into two portions at the flanges F and G, whereupon it becomes possible to inspect the plugs 14 and the valve seats 13 without taking any other part of the valve apart. This is a very decided advantage in the present construction and greatly enhances the ease of keeping it in a proper state of operability and repair.

In Fig. 3 there is shown an alternative arrangement in which the oil flows from two high-pressure pipe stills through pipes P and Q, while through pipe R hot or cold quenching or flushing oil enters the transverse pipe E. At the left and right ends of this pipe E there are blind flanges H, while the circle shown between these blind flanges and the first valve represents a pipe I which leads to a suitable expansion chamber or vaporizing chamber, not shown in this figure. This arrangement has the further advantage that by merely removing the blind flanges H at each end of this pipe system it will be possible to remove any carbon deposits therein by the simple expedient of thrusting a suitable cleaning tool thereinto, while, if necessary, by separating the pipe from the valve proper at the flanges J, access to the plugs, and possibly their replacement, may be had without the necessity of disconnecting any other parts of the apparatus.

A particular advantage of the type of valve described herein lies in the fact that it may be used in manifold for controlling the back pressure on oil cracking stills. The shape of the plug, with its rounded nose, is of particular advantage in increasing the velocity of the flow of oil or vapor at the side walls of the passageway 11, so as to prevent the adhesion of carbon thereto. Furthermore, packing failure is eliminated because of the fact that the packing is all on the low-pressure side of the valve and additionally because of the fact that the valve stem is thoroughly cooled, so as to prevent carbonization or burning of the packing.

An additional feature of advantage lies in the fact that the valve stem is not subjected to distorting strains, because the pressure which it is intended to resist is straight ahead on the valve stem at all times, so that there is no tendency for it to be bent to one side or the other.

When it is considered that extremely high pressures are encountered in oil cracking operations and that accurate and immediate control of the operation is highly essential for the safety of those who are operating the plant, it will be apparent that the present construction presents a considerable advance in this particular art.

Obvious modifications in the method, for example, of attaching the bonnet or of attaching the yoke to the bonnet, or in the method of connecting the valve stem with the plug, are all to be construed as being within the scope and intent of the present invention; nor are there any limitations to the material of which the valve is to be constructed, provided only that it is sufficiently strong and durable for the hard usage to which it is subjected.

I claim:

1. In an expansion valve for the control of an oil-cracking system, the improvement which comprises a cross-shaped valve body, means for passing oil therethrough in one direction and a transfer line for passing hot oil under pressure thereinto at substantially a right angle to the first mentioned direction, the transfer line being restricted in diameter at a point near its inner end so as to cause an increase in the speed of flow of the oil along the walls of the transfer line; a seat at the end of the transfer line; a blunt-nosed slightly tapered plug for obturating the exit of the transfer line; a plain stem attached to said plug for operating the same; a bonnet having a closed cylindrical space through which said stem passes, thus forming an annular space surrounding the stem; external operating threads on said stem and means for cooling that portion of the stem that is out of contact with the valve contents comprising an inlet and an outlet for circulating a cooling fluid through said annular space.

2. A high-pressure valve comprising a cross-shaped body portion, a bonnet on one side thereof, a valve stem extending through a closed cylindrical space within said bonnet and forming an annular space surrounding the stem, a valve plug attached to said stem, a high-pressure inlet having a valve seat located opposite said plug and cooperating therewith to close said inlet, means for admitting fluid to the body of the valve independently of the high-pressure inlet, an outlet from said body, and means for introducing and withdrawing a cooling fluid into and from said space.

3. A high-pressure release valve comprising a cross-shaped body, an inlet at one side thereof, a valve seat therein of substantially the same diameter as said inlet, a blunt-nosed plug cooperating with said seat, a stem attached to said plug, a bonnet having a closed cylindrical space therein through which the stem passes, thereby forming an annular space around the stem, threads on the stem outside of the valve body, means for passing fluid into said valve body at an angle to the valve stem, and means for passing a fluid around that portion of the valve stem that passes through the space within the bonnet.

JOHN K. MacKINNON.